United States Patent Office 3,418,691
Patented Dec. 31, 1968

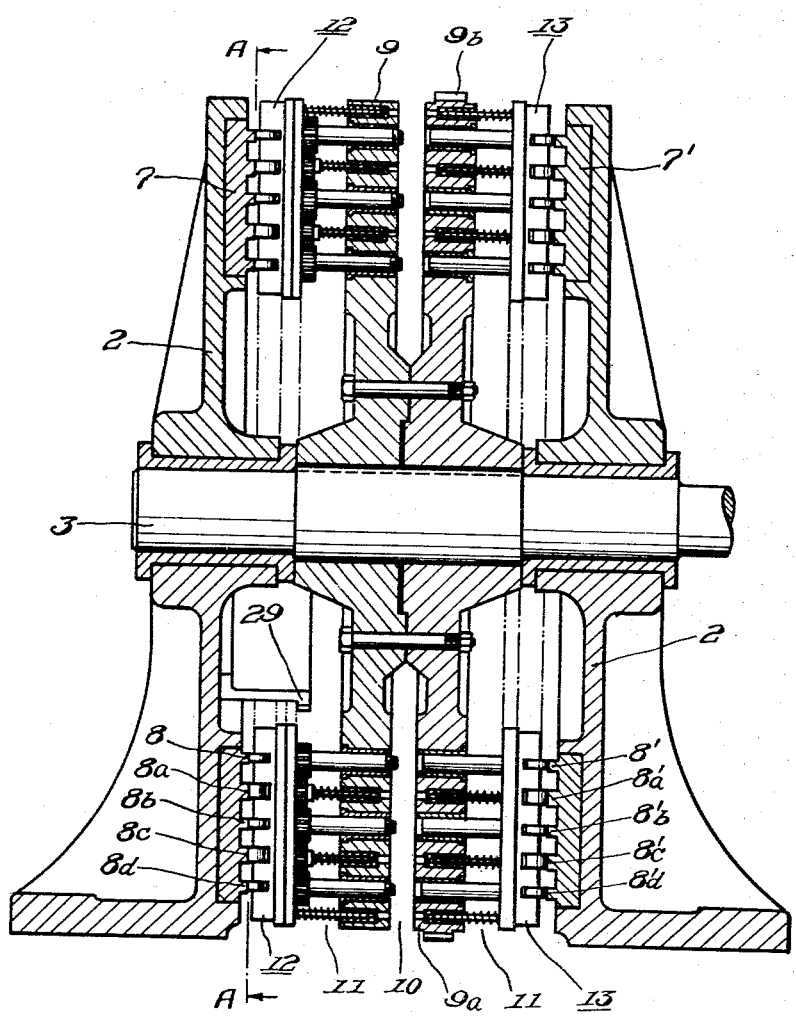

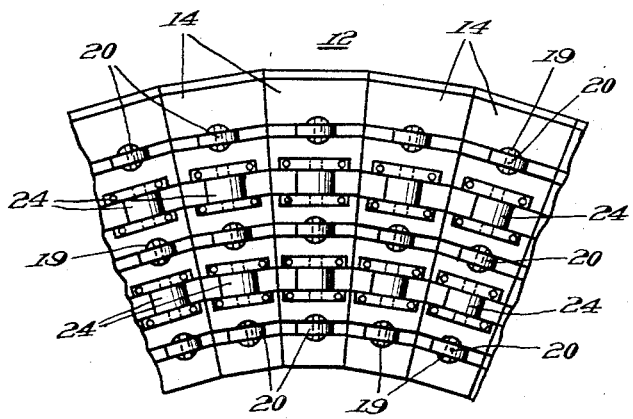
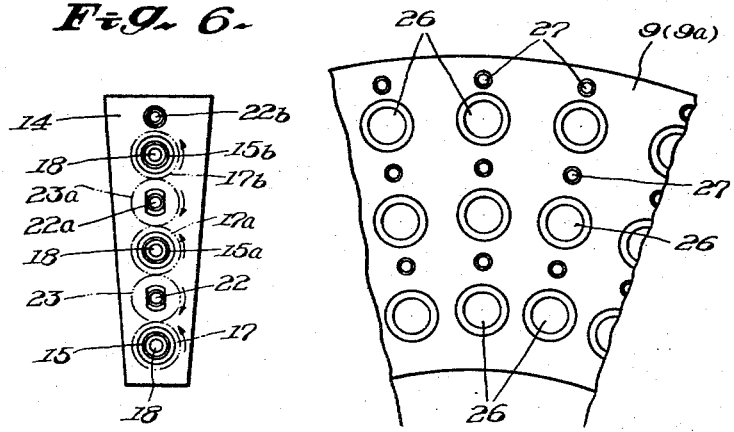

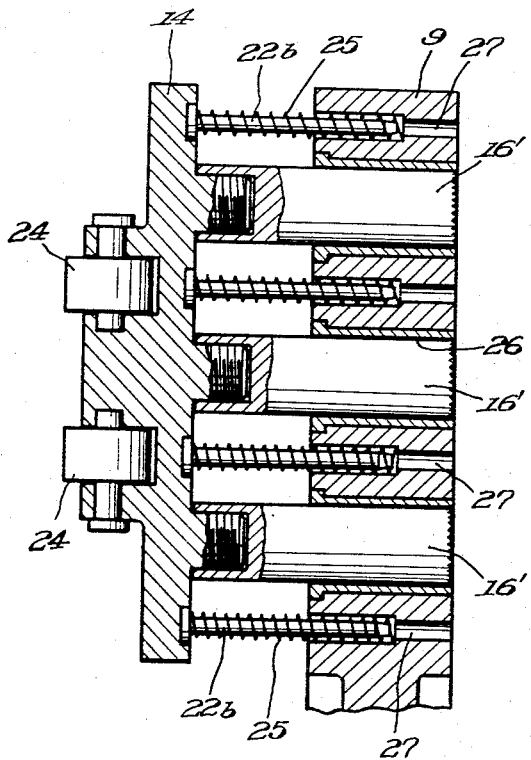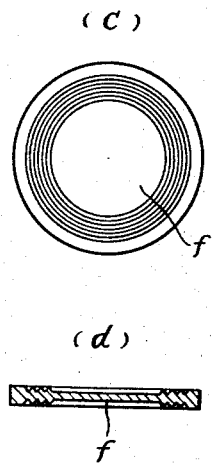

3,418,691
APPARATUS FOR AUTOMATICALLY FABRICATING CAPS, DISC AND THE LIKE ARTICLES OF PLASTICS
Mikihiko Hanai, 8-7 4-chome, Kachidoki, Chuo-ku, Tokyo, Japan
Filed May 20, 1966, Ser. No. 551,698
Claims priority, application Japan, Dec. 28, 1965, 40/80,542
4 Claims. (Cl. 18—20)

ABSTRACT OF THE DISCLOSURE

This apparatus includes rotary platen means carrying a multiplicity of forcing mold assemblies radially arranged on one side of such rotary platen means and a multiplicity of supporting mold assemblies radially arranged on the other side of the rotary platen means. Male molds are carried on each of the forcing mold assemblies and female molds are carried on each of the supporting mold assemblies in aligned relation. The apparatus also includes other features such as gear train means carried by the rotary platen means and the male molds, and a stationary gear segment means is present to engage and drive the gear train means to rotate the male molds and unscrew them from a formed threaded article at one portion of movement of the rotary platen means. Base plates are operably associated with each of the mold assemblies and are movable independently in relation to knock-out pins slidably engaged with each of the molds present in the apparatus.

This invention relates to apparatus for automatically fabricating caps, discs and the like articles of plastics and more particularly to those of the type adapted to be fed with properly heat-softened plastic material of web form and operable to form at a time a number of articles such as internally threaded or nonthreaded caps or discs from the plastic web and to deliver the articles thus formed exteriorly of the apparatus.

According to the present invention, there is provided an automatic apparatus of the type described which comprises rotary platen means, a multiplicity of mold-forming units mounted on said rotary platen means and each including a plurality of forcing mold assemblies and a plurality of supporting mold assemblies arranged in spaced opposite relation to said respective forcing mold assemblies, and stationary annular cam means for operating said forcing and supporting mold assemblies with rotation of said rotary platen means in a predetermined sequential relation to each other whereby a plurality of articles are formed simultaneously from a heated plastic web being fed between the forcing and supporting mold assemblies and subsequently delivered exteriorly of the machine, said articles being internally threaded, if required, while being formed.

Figure 1:
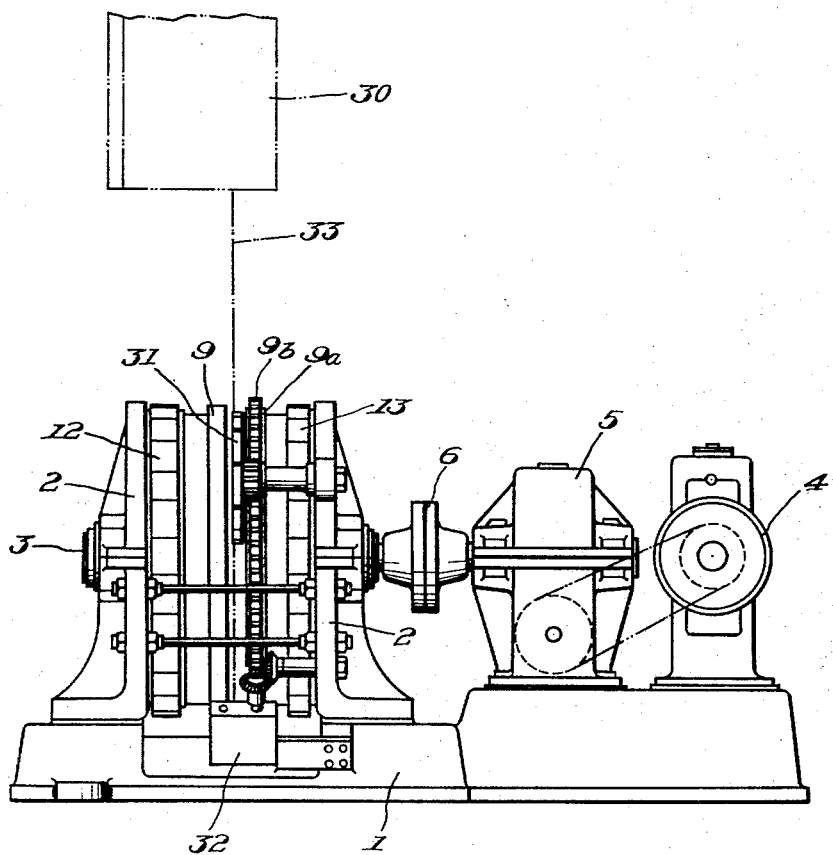
Figure 2:
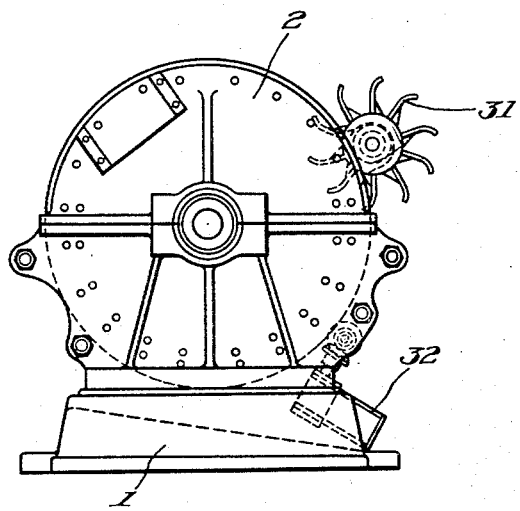
Figure 10:
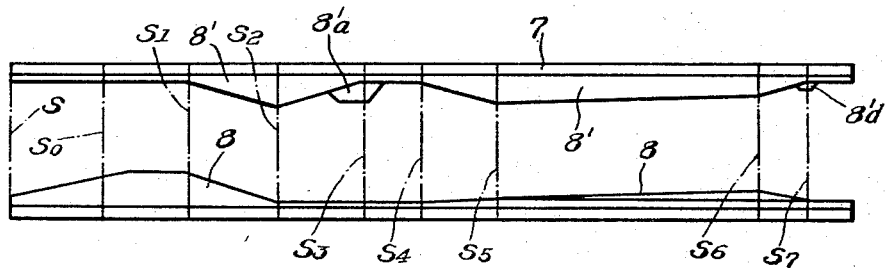
Figure 4:
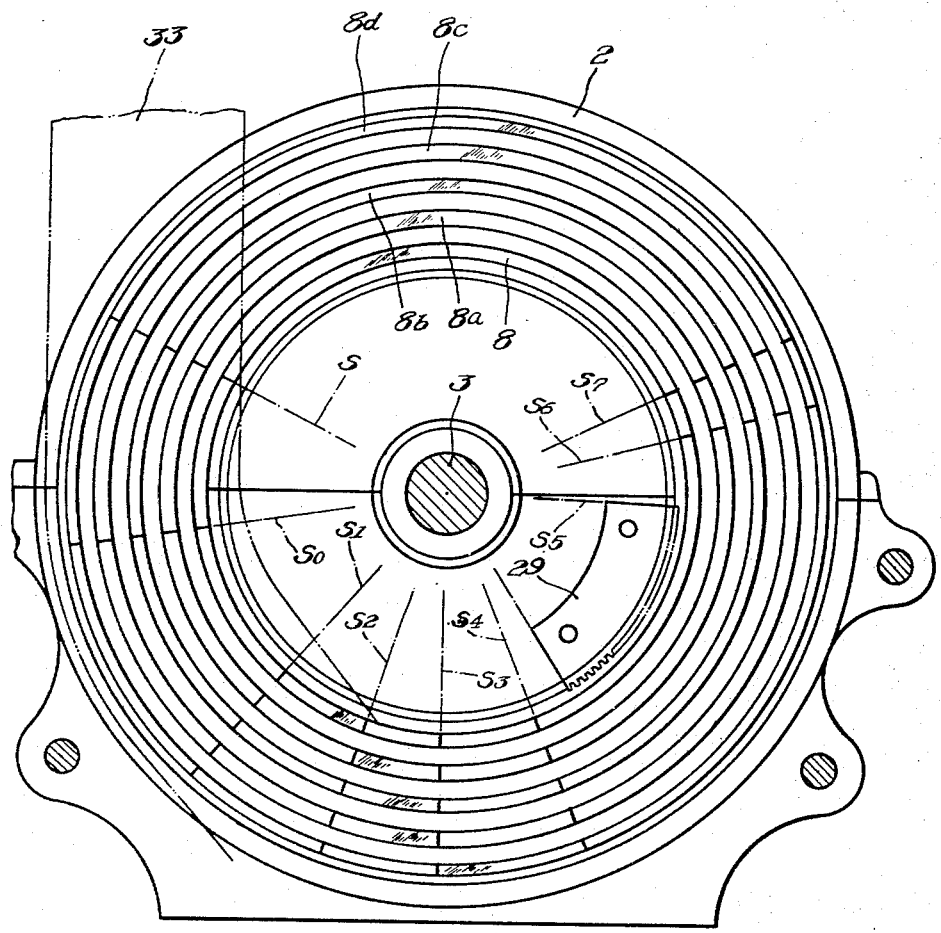
Figure 8:
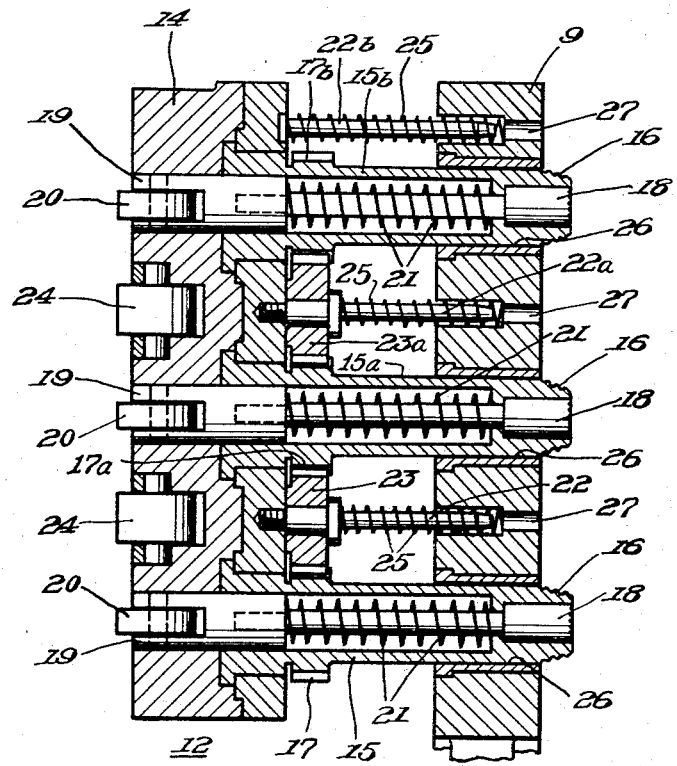
Figure 9:
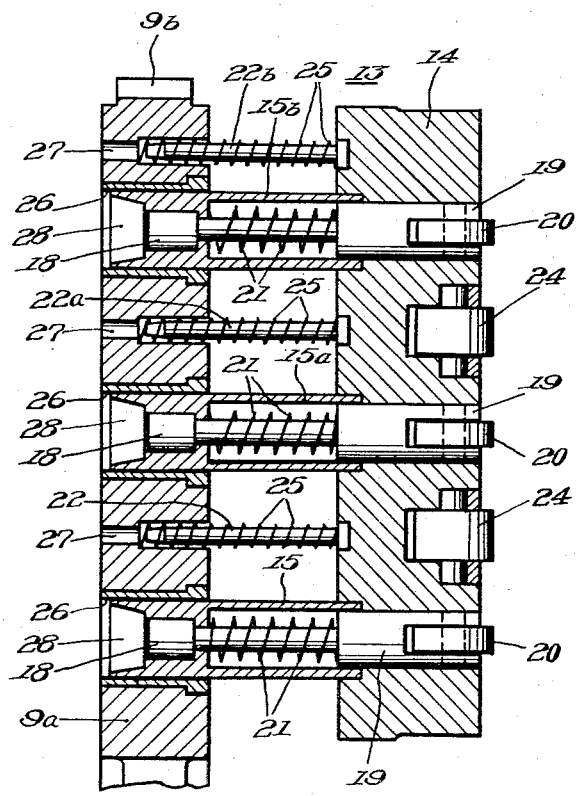
Figure 11A:
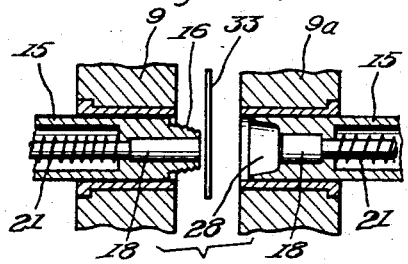

The foregoing and other objects, features and advantages of the present invention will become apparent from the following description when taken in conjunction with the accompanying drawings, which illustrate one preferred embodiment of the invention and in which:

FIG. 1 is a side elevational view of the entire system embodying the present invention;
FIG. 2 is a front elevational view of same;
FIG. 3 is an enlarged side elevation, in vertical axial cross section, of the essential part of the apparatus shown in FIGS. 1 and 2;

FIG. 4 is a vertical transverse cross section taken along the line A—A in FIG. 3;
FIG. 5 is a front view showing a few of the mold assemblies as arranged on the associated rotary platen;
FIG. 6 is a rear view of one of the mold assemblies;
FIG. 7 is a fragmentary front view of the rotary platen carrying the forcing mold assemblies;
FIG. 8 is an enlarged radial cross-sectional view of a forcing mold assembly;
FIG. 9 is a view similar to FIG. 8, showing a supporting mold assembly cooperable with the forcing mold assembly shown in FIG. 8;
FIG. 10 is a developed view diagramatically showing the cam profiles;
FIGS. 11A to 11D illustrate the sequence of the punching and forming operations;
FIGS. 12a and 12b illustrate two forms of product in cross section; FIG. 12a showing a threaded cap and FIG. 12b a nonthreaded one;
FIG. 13 is a radial cross-sectional view of a forcing mold assembly usable in forming packing discs; and
FIGS. 14c and 14d are a plan and a cross-sectional view of the packing disc formed.

Referring to the drawings, and first to FIGS. 1 and 2, the forming machine includes a base 1 and a pair of support frames 2 mounted thereon in alignment with each other with an appropriate space therebetween. A rotative shaft 3 is mounted horizontally on the support frames 2 substantially in the center thereof and is properly rotated by an electric motor 4 mounted on the machine base 1 through a speed reduction unit 5 and a coupling 6, as shown in FIG. 1. Referring next to FIG. 3, annular supports 7 and 7' are fitted on the inside of the support frames 2 and, in this embodiment, are each formed with five annular cams 8, 8a 8b, 8c, 8d or 8', 8'a, 8'b, 8'c, 8'd encircling the rotative shaft 3. Each of the annular cams are profiled in respective manners as will be described hereinafter in detail.

Fixedly mounted on the rotative shaft 3 between the support frames 2 are rotary platens 9 and 9a which are fixed together as by bolt means and are appropriately spaced apart from the respective support frames 2, as indicated at 11, and from each other along the outer periphery, as indicated at 10. Formed on one of the rotary platens 9a is a gear 9b to serve the purpose of driving a delivery unit provided for discharging the products exteriorly of the machine, as will be described later.

Reference numeral 12 indicates forcing mold assemblies mounted on one of the rotary platens 9, and 13 indicates supporting mold assemblies mounted on the other rotary platen 9a.

Specifically, in this embodiment, the forcing mold assemblies 12 are each designed to mold-form three pieces at a time or in succession and are radially arranged on the outside of the rotary platen 9. As shown in FIG. 8 on an enlarged scale, each of the forcing mold assemblies 12 includes a base plate 14 and three tubular supports 15, 15a and 15b rotatably mounted thereon in properly spaced-apart relation to each other and extending therefrom in the same direction. Each of the tubular supports has a frustoconically-shaped head which is externally threaded as at 16 and serves as a male mold. Gears 17, 17a and 17b are formed on the respective tubular supports 15, 15a and 15b adjacent to their base ends secured to the plate 14.

Slidably fitted in each of the tubular supports 15, 15a and 15b is a slide rod 19 which is reduced in diameter intermediate its ends and the inner extreme end 18 of which acts as a push rod. A roller 20 is carried on the slide rod 19 at its outer end and a compression spring 21 is arranged to encircle the reduced-diameter portion of the slide rod. Under this bias of compression spring 21, the slide rod 19 is normally held in a position such that the inner extreme end of the push rod 18 lies substantially flush with the end face of the male mold 16.

Guide rods 22, 22a and 22b are arranged between each two adjacent tubular supports 15-15a and 15a-15b and above tubular support 15b, and are each fitted with a coiled spring 25, as seen in FIG. 8. Two of the guide rods 22 and 22a also serve to support respective gears 23 and 23a which form a gear train together with gears 17, 17a and 17b formed on the tubular supports 15, 15a and 15b, respectively. Rollers 24 are carried on the outside of the base plate 14 between each two adjacent slide rods 19 by appropriate means. These rollers 24 and above-described ones 20 are cooperable with respective annular cams 8a, 8c and 8, 8b, 8d. Namely, the rollers are held in pressure contact with the respective camming surfaces of the annular cams under the bias of springs 21 and 25 so that the push rods 18 are moved back and forth under control of the respective cams 8, 8b and 8d as they are rotated around the shaft 3 and that the base plate 14 carrying male molds 16 is moved back and forth as a whole under control of the cams 8a and 8c. As shown, the tubular supports 15, 15a and 15b extend inwardly into respective bearing holes 26 formed in the rotary platen 9 while the guide rods 22 extend inwardly into respective guide holes 27 also formed in the platen 9. A multiplicity of such forcing mold assemblies 12 are radially arranged on the rotary platen 9, as seen in the fragmentary illustration of FIG. 5, each assembly and its base plate 14 moving independently of every other assembly as the rotary platen 9 rotates in relation to the fixed cam tracks 8a and 8c.

Supporting mold assemblies 13 are each of substantially the same construction as the forcing mold assemblies 12 and mounted on the rotary platen 9a in opposing relation to the assemblies 12. Namely, each of the arcuately short, independently movable supporting mold assemblies 13 includes, as shown in FIG. 9, rollers 20 and 24 cooperable with annular cams 8', 8'a, 8'b, 8'c and 8'd on the support frame 2, tubular supports 15, 15a, 15b and guide rods 22, 22a, 22b. Tubular supports 15, 15a and 15b extend inwardly from the base plate 14 into bearing holes 26 formed in the rotary platen 9a while guide rods 22, 22a and 22b extend into respective guide apertures 27 also formed in the platen 9a. The cavity or supporting mold assembly 13, however, differs from the forcing mold assembly 12 in that the tubular supports 15, 15a and 15b on the former are fixed in base plate 14 and each carry at its extreme end a female mold 28 cooperable with the corresponding male mold 16 in the forcing mold assembly 12.

A gear segment 29 (FIGS. 3 and 4) is provided on one of the support frames 2 which cooperates with the forcing mold assemblies 12 on the rotary platen 9. The gear segment 29 is designed to mesh with the gear 17 on the radially innermost tubular support 15 when the latter is carried by the rotary platen 9 into a predetermined angular position, as will be described later. It will be understood that, when the gear 17 on the tubular support 15 is thus rotated, the remaining gears 17a and 17b are also rotated in the same direction by way of intermediate gears 23 and 23a. In this manner, the tubular supports 15, 15a and 15b are all rotatable in a direction to unscrew the male molds formed thereon from respective articles just formed thereby to allow removal of the latter.

Referring again to FIGS. 1 and 2, reference numeral 30 indicates a device for heat-softening plastic material 33 of web form and feeding it into the spacing between the rotary platens 9 and 9a. Reference numeral 31 indicates a bladed wheel for scraping out formed products; and 32 indicates a device for discharging waste material. The bladed wheel 31 and the waste-discharging device 32 are both arranged to be driven by the peripheral gear 9b on the rotary platen 9a but they may be driven by any other means, if desired.

In operation, as the rotative shaft 3 is driven to rotate the rotary platens 9 and 9a as an integral unit, the forcing and supporting mold assemblies 12 and 13 are carried around the rotative shaft 3 in a plane at right angles thereto while maintaining the aligned opposite relation therebetween. At the same time, the male and female molds 16 and 28 and asociated push rods 18 are caused to advance and retract in a predetermined sequence under the control of annular cams 8, 8a, 8b, 8c, 8d, 8', 8'a, 8'b, 8'c and 8'd to punch the softened plastic web 33 as fed from the heating device 30 into the spacing 10 between the rotary platens 9 and 9a and then to form the punched stocks into internally threaded caps, which are subsequently released to be scraped or picked out of the machine.

The above sequential operation will next be described in further detail with reference to FIGS. 4, 10 and 11. As described hereinbefore, all the annular cams 8, 8a, 8b, 8c, 8d, 8', 8a, 8'b, 8'c and 8'd cooperate with the forcing and supporting mold assemblies 12 and 13. Cams 8, 8b, 8d, 8', 8'b and 8'd in contact with the respective rollers 20 serve the purpose of actuating the push rods 18. The remaining cams 8a, 8c, 8'a and 8'c, which are in contact with the respective rollers 24, serve the purpose of actuating the base plates 14 of the assemblies 12 and 13 each as a unit. As will readily be understood, the cams in each of the two groups are profiled in two different fashions, and FIG. 10 diagrammatically illustrates such a pair of cam formations. Description will next be made on the camming operation with reference to FIG. 10 and further to FIGS. 4 and 11. As shown in FIGS. 4 and 10, cams 8, 8b and 8d for push rods 18 have a profile which starts to rise slowly at S, reaches a peaks at $S_1$, falls gradually to reach a bottom at $S_2$, and then dwells until $S_4$ is reached. At this point, the profile again starts to rise this time more slowly to form another relatively low peak at $S_6$, then falls until $S_7$ is reached and dwells back to S.

Cams 8a and 8c for actuation of base plates 14 have a profile which does not rise between S and $S_5$, gradually rises between $S_5$ and $S_6$ to a slight height and falls from $S_6$ to $S_7$ to below the profile of cams 8, 8b and 8d. As shown in FIG. 4, the actuating range of the cams 8, 8b and 8d extends approximately half the circumference of the cam ring.

Cams 8', 8'b and 8'd for the supporting mold assembly 12, and specifically push rods 18 thereof, include, as shown in the upper half of FIG. 10, a low dwell portion extending between S and $S_1$, rise rather sharply between $S_1$ and $S_2$ to form an angular peak, then fall to form a low dwell portion between $S_3$ and $S_4$, again rise to another peak at $S_5$, which has a height nearly equal to the peak at $S_2$. Subsequently, the profile falls gradually to $S_6$ and then relatively rapidly to $S_7$, subsequently forming another low dwell portion back to S. Cams 8'a and 8'c for base plate 14 have a peak at $S_3$, which extends higher than the adjacent portion of cam 8', and another peak at $S_7$, which is only slightly higher than the adjacent portion of cam 8'.

The magnitudes of rise and fall of these cams are determined according to the dimensions of the cap to be formed so that the forcing and supporting mold assemblies 12 and 13 including push rods 18 are operated in a predetermined sequential relation under the control of such cams to effect punching, forming, thread generation and separation of the formed product from the molds.

Operation of the mold assemblies 12 and 13 will next be described with reference to FIGS. 10 and 11.

Figure 11E:
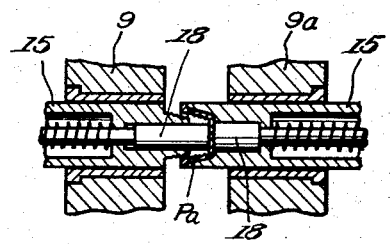
Figure 11B:
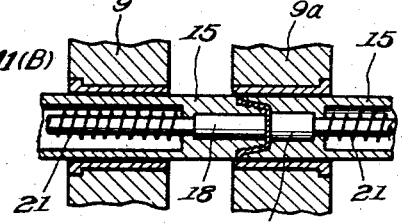
Figure 11F:
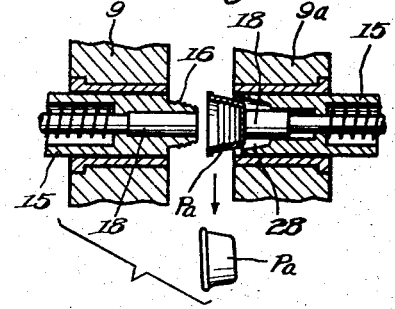
Figure 11C:
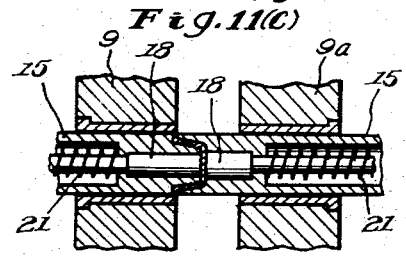
Figure 12A:
Figure 11D:
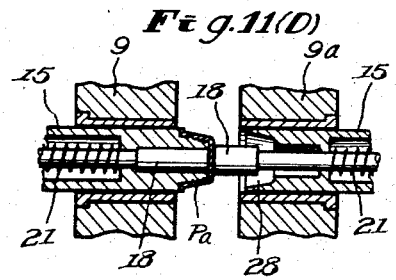
Figure 12B:
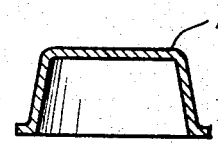

With the web material 33 fed between the rotary platens 9 and 9a, each of the male molds 16 on the forcing mold assembly 12 starts at S to advance gradually (FIG. 11A) and at $S_1$ forces the material 33 into the opposing female mold 28 on the supporting mold assembly 13 to form the material into a desired configuration, as shown in FIG. 11B. Subsequently, the male mold 16 retracts and simultaneously the female mold 28 advances to such an extent that only its extreme end portion fits into the bearing hole 26, which receives the tubular support 15 carrying the male mold, as shown in FIG. 11C, thereby to sever off the formed area of the web material. The female mold 28 then retracts as shown in FIG. 11D and at $S_3$ the push rod 18 accommodated therein is advanced and retracted under the control of associated cam 8 in order to further ensure the separation of the formed product $Pa$ from the web material. Subsequently, in the range between $S_4$ and $S_5$ the female mold 28 advances, the male mold 16 advancing to a slight extent at $S_5$. At the same time the push rod 18 associated with the male mold 16 advances to grip the formed product $Pa$ in cooperation with the female mold. At the angular position $S_5$ the gear 17 formed on the tubular support 15 carrying the male mold 16 comes into mesh with the gear segment 29 to rotate the male mold 16, which is continuously carried around by the rotary platen 9.

The male mold 16, which is externally threaded, is rotated in a direction to uscrew itself, as pointed out hereinbefore, so that the product $Pa$ formed with internal threads is released from the male mold. During this unscrewing, in the angular range between $S_5$ and $S_6$, the female mold 28 is retracted gradually and push rod 18 associated with the male mold 18 is advanced with rotation of the latter. Being thus gripped between the push rod 18 and female mold 28, the formed product $Pa$ can be unscrewed, as shown in FIG. 11E. At $S_6$, the gear 17 is released from the gear segment 29 and the tubular support 15 ceases to rotate. At $S_7$, the push rod 18 associated with the male mold 16 retracts and at the same time the one associated with the female mold 28 advances (FIG. 11F) to push the formed product $Pa$ out of the latter and then retracts to initial position, as shown in FIG. 11A. The product $Pa$ pushed out is scraped or picked off by the rotating bladed wheel 31 and falls into a chute or other like means provided below to be carried away. On the other hand, the punched waste material is led beneath the machine base 1 to be removed exteriorly of the machine by discharging device 32.

The sequential operation described above is performed by cooperation of the forcing and supporting mold assemblies 12 and 13 during approximately half their revolution starting at the feed position where the web material 33 is fed into the spacing 10 between the rotary platens 9 and 9a.

Though, in the above, description has been made principally on fabrication of caps $Pa$ shaped as shown in FIG. 12a and carrying internal threads $t$, it will be understood that nonthreaded caps $Pa'$ as shown in FIG. 12b can also be fabricated in the same manner as long as the male molds 16 are replaced by nonthreaded ones and the means for rotating the tubular supports 15, 15a and 15b are dispensed with.

Also, the forcing and supporting mold assemblies 12 and 13 can be replaced, by those of any other design for fabrication of different articles. For example, packing discs $f$ shown in FIGS. 14c and 14d can be fabricated by the use of forcing mold assemblies shown in FIG. 13 and correspondingly designed supporting mold assemblies not shown. The forcing mold assembly shown in FIG. 13 also includes a base plate 14 carrying two spaced apart rollers 24 to cooperate with the annular cams 8a and 8c and molds 16 having a formed end face.

With the inventive apparatus constructed and arranged as described herein, it will be appreciated that a large number of articles such as caps and discs can be simultaneously fabricated from plastic material of web form in an automatic fashion by a sequential operation of mold assemblies and thus a highly improved production efficiency can be attained.

It is to be understood that the present invention is not to be restricted to the details set forth but many changes and modifications may be made without departing from the spirit and scope of the invention as defined in the appended claims.

What is claimed is:

1. An apparatus for automatically fabricating caps, discs or the like articles of plastics comprising driven rotary platen means, a multiplicity of forcing mold assemblies radially arranged on one side of said rotary platen means, a multiplicity of supporting mold assemblies radially arranged on the other side of said rotary platen means in spaced opposite relation to said respective forcing mold assemblies, male molds carried on each of said forcing mold assemblies, female molds carried on each of said supporting mold assemblies in aligned relation to said respective male molds, said male molds being rotatably positioned interengaging, gear train means carried by said rotary platen means and said male molds, stationary gear segment means for engaging and driving said gear train means to unscrew said male molds from a formed threaded article at one portion of the rotation of said rotary platen means, means for feeding plastic material of web form into the spacing between said forcing and supporting mold assemblies, and stationary cam means for moving said male and female molds toward and permitting their movement away from each other with rotation of said rotary platen means in a predetermined sequential relation to form a plurality of articles simultaneously from the plastic web fed into the spacing between said forcing and supporting mold assemblies and to release the formed articles for delivery out of the apparatus.

2. An apparatus as in claim 1 comprising a radially segmented base plate operably associated with each side of said rotary platen means on the axially outer side of said mold assemblies and rotatable therewith, said base plate segments being slidably positioned for axial movement but being resiliently urged axially outwardly of said rotary platen means, said base plate segments each positioning a plurality of radially aligned mold assemblies thereon, a plurality of said cam means are provided and are stationary, and at least one of such cam means engages each of said base plates to move segments thereof towards said rotary platen means when said base plates are rotated, knock-out pins are slidably received in each of said molds and extend axially thereof, and other of said cam means engage said knock-out pins to move them axially inwardly of said rotary platen means for article contact action independently of the positions of said base plates.

3. An apparatus for automatically fabricating caps, discs or the like articles of plastics comprising a frame means, a driven shaft journalled on said frame means, rotary platen means carried by said shaft in a plane perpendicular thereto, a multiplicity of forcing mold assemblies radially arranged on one side of said rotary platen means, a multiplicity of supporting mold assemblies radially arranged on the other side of said rotary platen means in spaced opposite relation to said respective forcing mold assemblies, male molds carried on each of said forcing mold assemblies, female molds carried on each of said supporting mold assemblies in aligned relation to said respective male molds, each of said mold assemblies including a base plate operably associated with such mold assembly on the axially outer end thereof, means for feeding plastic material of web form into the spacing between said forcing and supporting mold assemblies, stationary cam means for engaging said base plates and moving said male and female molds toward and away from each other with rotation of said rotary platen means in a predetermined sequential relation to form a plurality of articles simultaneously from the plastic web fed into the spacing between said forcing and supporting mold assemblies and to release the formed articles for delivery out of the apparatus, said base plates being slidably positioned in said mold assemblies but are resiliently urged axially outwardly of said rotary platen means, annular cam means to move said base plates in towards said rotary platen means, knock-out pins slidably received in each of said molds and extending axially thereof, and individual annular cams engaging said knock-out pins to move them axially inwardly of said rotary platen means for article knock-out action.

4. An apparatus as in claim 3 and including bearing means journalling said male molds in said rotary platen means, said male molds having axially outer base portions rotatably carried by the one of said base plates thereadjacent, gear means operably carried by said male molds on the periphery thereof and radially aligned thereon, second gear means journalled on said one of said base plates in radial spaced relation and engaging said male mold gear means to form a gear train, said male molds having threaded portions to form an article having threads thereon, and gear segment means fixed on a part of said frame means for engaging the radially innermost one of said gear train as said rotary platen means is moved thereby to rotate said male molds and remove them from a formed threaded article.

References Cited

UNITED STATES PATENTS

| | | | |
|---|---|---|---|
| 2,513,216 | 6/1950 | Sullivan et al. | 18—20 |
| 2,573,365 | 10/1957 | Scholes et al. | 18—20 |
| 2,799,049 | 7/1957 | Wilson | 18—2 X |
| 2,799,050 | 7/1957 | Traycoff | 18—2 X |
| 2,973,555 | 3/1961 | Schwepke | 18—20 |
| 3,084,387 | 4/1963 | Tochner et al. | 18—20 X |
| 3,276,079 | 10/1966 | Cohn | 18—20 |
| 2,593,438 | 4/1952 | Gora. | |
| 2,593,668 | 4/1952 | Gora. | |
| 2,980,961 | 4/1961 | Gora. | |
| 3,079,633 | 3/1963 | Fritz. | |

FOREIGN PATENTS

| | | |
|---|---|---|
| 177,339 | 8/1959 | Russia. |
| 1,294,708 | 4/1962 | France. |
| 955,507 | 4/1964 | Great Britain. |

WILLIAM J. STEPHENSON, *Primary Examiner.*

U.S. Cl. X.R.

18—2, 19